J. R. FINLEY.
Cultivator.
No. 47,534.
Patented May 2, 1865.
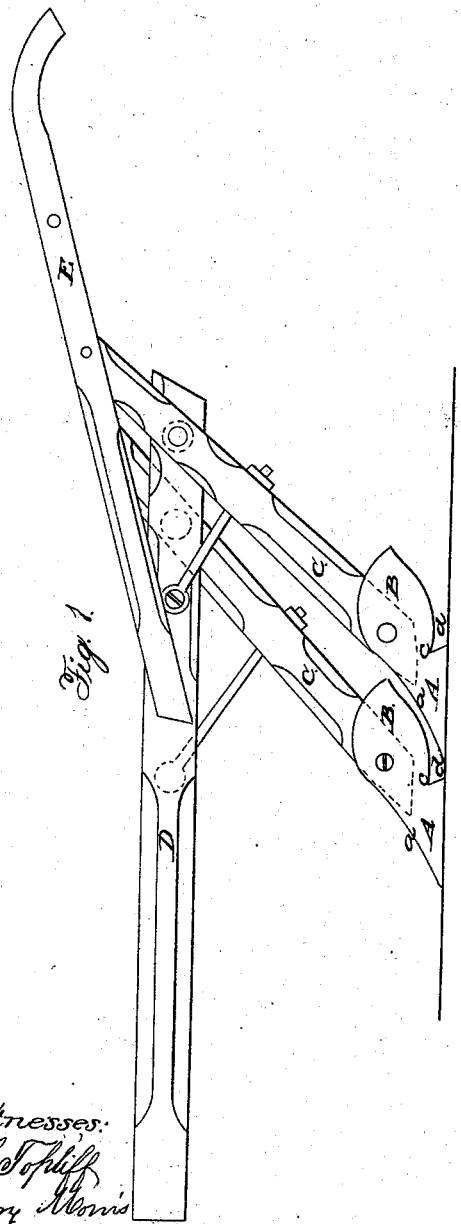
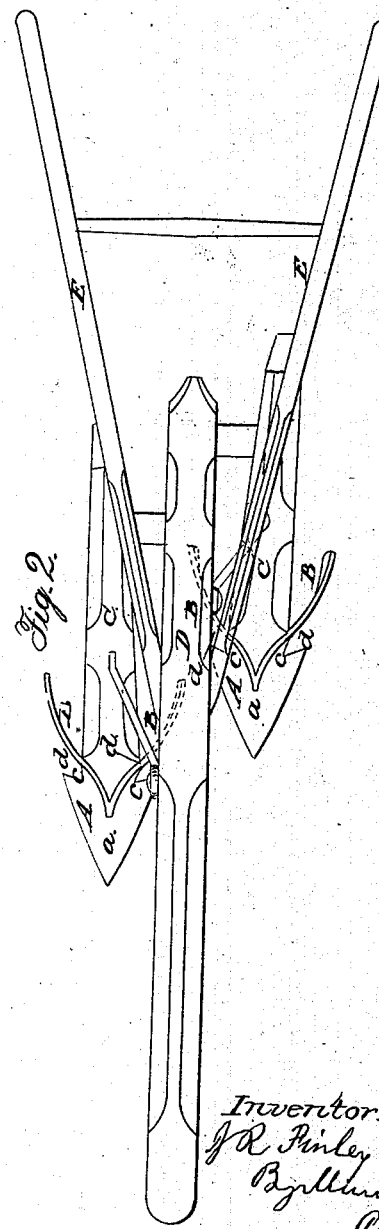

UNITED STATES PATENT OFFICE.

JAMES R. FINLEY, OF DELPHI, INDIANA.

IMPROVEMENT IN CULTIVATOR-PLOWS.

Specification forming part of Letters Patent No. 47,534, dated May 2, 1865.

*To all whom it may concern:*

Be it known that I, JAMES R. FINLEY, of Delphi, in the county of Carroll and State of Indiana, have invented a new and Improved Cultivator-Plow; and I do hereby declare that the following is a full, clear, and exact description thereof, which will enable others skilled in the art to make and use the same, reference being had to the accompanying drawings, forming part of this specification, in which—

Figure 1 is a side view of my invention; Fig 2, a plan or top view of the same.

Similar letters of reference indicate like parts.

This invention relates to a new and useful improvement in the shape of the plow, whereby much friction is avoided in the passage of the plow through the earth, and the former made to act much more efficiently than hitherto in pulverizing the soil, eradicating weeds, &c.

My invention consists in having the share of the plow made to run horizontally on the bottom of the furrow, and having the upper part or mold-board to extend down to meet the upper part of the back of the share and form a recess or notch at the back part of the latter, whereby the mold-board is made to perform its legitimate work of turning without at all interfering with the work of the share, which is that of opening the furrow.

The plow is of the kind usually termed "double," having a mold-board at each side, as well as a share.

The share A has its lower edge horizontal and is inclined at each side, with a central ridge, *a*, at its center, the front end terminating in a point, *b*.

The mold-boards B B are a continuation of the sides of the share A; but they do not extend down to the lower edge of the share, but to their upper edges only, as shown at *c*, leaving two notches, *d d*, one at each side of the plow. The mold-boards B B are curved so as to throw or cast the earth outward or laterally at each side. By this arrangement the mold-boards pass through the earth and act upon the same with but little friction.

In the ordinary plows the lower ends or parts of the mold-boards operate with considerable friction, as they extend down and form a continuous line with the back end of the share, and they tend in a great measure to prevent the perfect operation of the share.

My improvement admits of the share performing its work—to wit, that of opening the furrow—in a perfect manner, while the mold-boards cast the earth aside, the whole passing through the earth under a light and easy draft.

The plows are attached to the standards C C, and the latter secured to a beam D, provided with handles E E, arranged in the usual way.

I am aware that the mold-board and share for cultivator-plows have been made of one piece; but

What I claim as my improvement, and desire to secure by Letters Patent, is—

The equal or symmetrical mold-boards, when said parts form a continuation of the share and have the peculiar form and configuration as set forth and described.

JAMES R. FINLEY.

Witnesses:
LEVI M. GRAHAM,
J. H. GRIFFITH.